United States Patent
Ansari et al.

(10) Patent No.: US 12,105,830 B2
(45) Date of Patent: *Oct. 1, 2024

(54) SYSTEMS AND METHODS FOR SECURING AND DISSEMINATING TIME SENSITIVE INFORMATION USING A BLOCKCHAIN

(71) Applicant: NASDAQ, INC., New York, NY (US)

(72) Inventors: Akbar Ansari, Marlborough, MA (US); Thomas Fay, Succasunna, NJ (US); Dominick Paniscotti, Totowa, NJ (US)

(73) Assignee: Nasdaq Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/334,524

(22) Filed: Jun. 14, 2023

(65) Prior Publication Data

US 2023/0325525 A1 Oct. 12, 2023

Related U.S. Application Data (63) Continuation of application No. 17/512,993, filed on Oct. 28, 2021, now Pat. No. 11,704,429, which is a
(Continued)

(51) Int. Cl.
*G06F 21/64* (2013.01)
*G06F 21/60* (2013.01)
(Continued)

(52) U.S. Cl.
CPC ........ *G06F 21/6227* (2013.01); *G06F 21/602* (2013.01); *G06F 21/6209* (2013.01);
(Continued)

(58) Field of Classification Search
CPC ........ G06F 21/6209; G06F 2221/2101; G06Q 10/103; G06Q 2220/00
See application file for complete search history.

(56) References Cited

U.S. PATENT DOCUMENTS 10,108,812 B2   10/2018   Ansari et al.
10,579,819 B2   3/2020    Ansari
(Continued)

FOREIGN PATENT DOCUMENTS

WO   2000/26745   5/2000
WO   2001/67409   9/2001
(Continued)

OTHER PUBLICATIONS

International Search Report and Written Opinion issued in Application No. PCT/US2016/25189, 15 pages, dated Jul. 1, 2016.
(Continued)

*Primary Examiner* — David J Pearson
(74) *Attorney, Agent, or Firm* — Nixon & Vanderhye P.C.

(57) ABSTRACT

An information computer system is provided for securely releasing time-sensitive information to recipients via a blockchain. A submitter submits a document to the system and a blockchain transaction is generated and submitted to the blockchain based on the document (e.g., the document is included as part of the blockchain transaction). An editor may edit the document and an approver may approve the document for release to the recipients. Each modification and/or approval of the document is recorded as a separate transaction on the blockchain where each of the submitter, editor, approver, and recipients interact with the blockchain with corresponding unique digital identifiers—such as private keys.

20 Claims, 5 Drawing Sheets

Related U.S. Application Data continuation of application No. 16/776,211, filed on Jan. 29, 2020, now Pat. No. 11,188,673, which is a continuation of application No. 16/138,397, filed on Sep. 21, 2018, now Pat. No. 10,579,819, which is a continuation of application No. 15/418,407, filed on Jan. 27, 2017, now Pat. No. 10,108,812.

(60) Provisional application No. 62/288,294, filed on Jan. 28, 2016.

(51) Int. Cl.

| | | |
|---|---|---|
| G06F 21/62 | (2013.01) | |
| G06Q 10/06 | (2023.01) | |
| G06Q 10/10 | (2023.01) | |
| G06Q 20/02 | (2012.01) | |
| G06Q 20/06 | (2012.01) | |
| G06Q 20/36 | (2012.01) | |
| G06Q 20/38 | (2012.01) | |
| H04L 9/00 | (2022.01) | |

(52) U.S. Cl.
CPC ............ *G06F 21/64* (2013.01); *G06F 21/645* (2013.01); *G06Q 10/06* (2013.01); *G06Q 10/103* (2013.01); *G06Q 20/02* (2013.01); *G06Q 20/065* (2013.01); *G06Q 20/36* (2013.01); *G06Q 20/3829* (2013.01); *G06Q 20/389* (2013.01); *G06F 2221/2101* (2013.01); *G06F 2221/2107* (2013.01); *G06F 2221/2137* (2013.01); *G06Q 2220/00* (2013.01); *H04L 9/50* (2022.05)

(56) References Cited

U.S. PATENT DOCUMENTS

| | | | |
|---|---|---|---|
| 11,188,673 | B2 | 11/2021 | Ansari et al. |
| 11,704,429 | B2 * | 7/2023 | Ansari ................ G06F 21/6209 713/165 |
| 2003/0009413 | A1 | 1/2003 | Furbush et al. |
| 2003/0225672 | A1 | 12/2003 | Hughes et al. |
| 2007/0208800 | A1 | 9/2007 | Frohlich et al. |
| 2007/0276843 | A1 | 11/2007 | Lillibridge et al. |
| 2008/0109808 | A1 | 5/2008 | Wing et al. |
| 2008/0140578 | A1 | 6/2008 | Felt et al. |
| 2010/0228674 | A1 | 9/2010 | Ogg et al. |
| 2011/0231913 | A1 | 9/2011 | Feng et al. |
| 2013/0061049 | A1 | 3/2013 | Irvine |
| 2013/0238478 | A1 | 9/2013 | Bruno |
| 2013/0239230 | A1 | 9/2013 | Herbach et al. |
| 2013/0254052 | A1 | 9/2013 | Royyuru et al. |
| 2014/0280476 | A1 | 9/2014 | Chiussi et al. |
| 2014/0344015 | A1 | 11/2014 | Puertolas-Montanes et al. |
| 2015/0120567 | A1 | 4/2015 | Van Rooyen et al. |
| 2015/0170112 | A1 | 6/2015 | Decastro |
| 2015/0227897 | A1 | 8/2015 | Loera |
| 2015/0244690 | A1 | 8/2015 | Mossbarger |
| 2015/0262137 | A1 | 9/2015 | Armstrong |
| 2015/0262173 | A1 | 9/2015 | Durbin et al. |
| 2015/0310424 | A1 | 10/2015 | Myers |
| 2015/0324787 | A1 | 11/2015 | Schaffner |
| 2015/0332283 | A1 | 11/2015 | Witchey |
| 2015/0356523 | A1 | 12/2015 | Madden |
| 2015/0356555 | A1 | 12/2015 | Pennanen |
| 2015/0363777 | A1 | 12/2015 | Ronca et al. |
| 2015/0363783 | A1 | 12/2015 | Ronca et al. |
| 2015/0379510 | A1 | 12/2015 | Smith |
| 2016/0027229 | A1 | 1/2016 | Spanos et al. |
| 2016/0028552 | A1 | 1/2016 | Spanos et al. |
| 2016/0078219 | A1 | 3/2016 | Hernan |
| 2016/0080156 | A1 | 3/2016 | Kaliski, Jr. et al. |
| 2016/0112200 | A1 | 4/2016 | Kheterpal et al. |
| 2016/0125040 | A1 | 5/2016 | Kheterpal et al. |
| 2016/0323109 | A1 * | 11/2016 | McCoy ................ G06Q 50/184 |
| 2017/0091467 | A1 | 3/2017 | Pogorelik |
| 2017/0140408 | A1 | 5/2017 | Wuehler |
| 2017/0178127 | A1 * | 6/2017 | Kravitz ............ G06Q 20/38215 |
| 2017/0220815 | A1 | 8/2017 | Ansari et al. |
| 2019/0026485 | A1 | 1/2019 | Ansari et al. |
| 2020/0184095 | A1 | 6/2020 | Ansari et al. |
| 2022/0050914 | A1 | 2/2022 | Ansari et al. |

FOREIGN PATENT DOCUMENTS

| | | |
|---|---|---|
| WO | 2001/86373 | 11/2001 |
| WO | 2008/127428 | 10/2008 |
| WO | 2015/059669 | 4/2015 |
| WO | 2015/085393 | 6/2015 |
| WO | 2015/113519 | 8/2015 |
| WO | 2015/179020 | 11/2015 |
| WO | 2016/008659 | 1/2016 |
| WO | 2016/022864 | 2/2016 |
| WO | 2016/029119 | 2/2016 |

OTHER PUBLICATIONS

Nakamoto "Bitcoin: A Peer-to-Peer Electronic Cash System" www.bitcoin.org, 9 pages.

"Digital Currency Exchange Goes Live to Public in Melbourne, Australia" AlphaPoint, https://globenewswire.com/news-release/2015/12/10/794524/0/en/Digital-Currency-Exchange-Goes-Live-to-Public-in-Melbourne-Australia.html, Dec. 10, 2015, 3 pages.

"Nasdaq Linq Enables First-Ever Private Securities Issuance Documented with Blockchain Technology" Nasdaq, https://globenewswire.com/news-release/2015/12/30/798660/0/en/Nasdaq-Linq-Enables-First-Ever-Private-Securities-Issuance-Documented-With-Blockchain-Technology.html, 3 pages, Dec. 30, 2015.

International Search Report and Written Opinion issued in Application No. PCT/US2016/040711, 14 pages, dated Oct. 4, 2016.

"Blockchain Technologies Corp Makes History, 2016 Iowa Caucus Results Forever Documented on Blockchain" https://globenewswire.com/news-release/2016/02/06/808320/10159855/en/Blockchain-Technologies-Corp-Makes-History-2016-Iowa-Caucus-Results-Forever-Documented-on-Blockchain.html, 2 pages, Feb. 5, 2016.

"AlphaPoint Announces Blockchain Solution Custom-Built for Financial Institutions" AlphaPoint, https://globenewswire.com/news-release/2015/10/26/779929/0/en/AlphaPoint-Announces-Blockchain-Solution-Custom-Built-for-Financial-Institutions.html, 3 pages, Oct. 26, 2015.

"Nasdaq Launches Enterprise-Wide Blockchain Technology Initiative" Nasdaq, https://globenewswire.com/news-release/2015/05/11/734456/10133665/en/Nasdaq-Launches-Enterprise-Wide-Blockchain-Technology-Initiative.html, 3 pages, May 11, 2015.

"RR Donnelley to Pursue New Blockchain-Enabled Capabilities for Publishing Industry" https://globenewswire.com/news-release/2016/03/14/819355/0/en/RR-Donnelley-to-Pursue-New-Blockchain-Enabled-Capabilities-for-Publishing-Industry.html, 3 pages, Mar. 14, 2016.

U.S. Appl. No. 15/200,756, filed Jul. 1, 2016.

Notification of Transmittal of International Preliminary Report on Patentability and International Preliminary Report on Patentability in Application No. PCT/US2017/15543, 26 pages, mailed Feb. 9, 2018.

* cited by examiner

Fig. 1

Fig. 2

SYSTEMS AND METHODS FOR SECURING AND DISSEMINATING TIME SENSITIVE INFORMATION USING A BLOCKCHAIN

CROSS REFERENCE(S) TO RELATED APPLICATION(S)

This application is a continuation of U.S. application Ser. No. 17/512,993, filed Oct. 28, 2021, now allowed; which is a continuation of U.S. application Ser. No. 16/776,211, filed Jan. 29, 2020, now U.S. Pat. No. 11,188,673, issued Nov. 30, 2021; which is a continuation of U.S. application Ser. No. 16/138,397, filed Sep. 21, 2018, now U.S. Pat. No. 10,579,819, issued on Mar. 3, 2020; which is a continuation of U.S. application Ser. No. 15/418,407, filed Jan. 27, 2017, now U.S. Pat. No. 10,108,812, issued on Oct. 23, 2018; which claims the benefit of U.S. Patent Application No. 62/288,294, filed Jan. 28, 2016, the entire contents of each of which are incorporated herein by reference.

TECHNICAL OVERVIEW

The technology herein relates to cryptographic distributed systems that secure and disseminate electronic information. More particularly, the technology herein relates to a system that integrates a blockchain that stores, secures, and disseminates time-sensitive information.

INTRODUCTION

A number of electronic platforms (referred to as "wire services," "newswire services," "news release distribution services," "online news distribution services," and the like) exist that allow for the dissemination of news information (and other types of information) to appropriate recipients in a timely manner. Many such platforms provide a web-based interface that allows a customer to upload, for example, a report from the FDA regarding a new drug, or an earnings report for a company. This information may be received and then processed by the platform, stored into a database, and then released to recipients at a designated time (e.g., via email or published to a website or other data "feed").

In recent years, a number of features have been added to these services to address the needs of the people and organizations that use such services. For example, many services now include encryption features, advanced access control functionality (to enforce limits on which users can access which information), and/or workflow functionality that allows for the editing, review, and approval of information before it is disseminated. However, the inclusion of these features in a service can lead to audit trail gaps (or no audit trail at all). Furthermore, the increased complexity in these services can lead to errors. Thus, new and improved techniques and systems for delivering and securing such time-sensitive information are continually sought after.

SUMMARY

In certain example embodiments, a computer system is provided that enables users to securely record time-sensitive information (e.g., announcements, press releases, regulatory filings, and the like) along with associated meta-data using blockchain technology. The computer system and blockchain are programmed to allow dissemination of the information directly to selected parties at a set scheduled time by using programs or scripts (e.g., sometimes referred to as smart contracts) that have been added to the blockchain according to certain example embodiments. Access to the sensitive information that is stored on the blockchain may include a multi-signature requirement that is part of the embedded scripts that make up a given blockchain transaction. The intended recipients of the information may then directly interface with the blockchain at the scheduled time (e.g., that is controlled by the embedded script that is part of a transaction) to access information that has been securely stored thereon.

The features described herein may be combined to form additional embodiments and sub-elements of certain embodiments may form yet further embodiments. This summary is provided to introduce a selection of concepts that are further described below in the detailed description. This summary is intended neither to identify key features or essential features of the claimed subject matter, nor to be used to limit the scope of the claimed subject matter; rather, this summary is intended to provide an overview of the subject matter described in this document. Accordingly, it will be appreciated that the above-described features are merely examples, and that other features, aspects, and advantages of the subject matter described herein will become apparent from the following detailed description, figures, and claims.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Sections may be used in this Detailed Description solely in order to orient the reader as to the general subject matter of each section; as will be seen in the following text, the description of many features spans multiple sections, and headings should not be read as affecting the meaning of the description included in any section. For example, the inventors contemplate combinations of features that are discussed in more than one of the sections.

Overview

In certain example embodiments, an information storage system (e.g., a computer system that may include one or more computer nodes) includes an interface to a blockchain (e.g., plural distributed computing nodes that each possess part or all of a distributed cryptographic ledger) and is programmed to accept or receive electronic information for client systems. When the electronic information is received, a new blockchain transaction is generated that includes or carries the electronic information and this new blockchain transaction is submitted to the blockchain for inclusion thereon.

In certain examples, users may be authorized to submit, edit, or approve (e.g., for release) the information (e.g., the originally submitted document or a version of that document) to the blockchain. After the initial submission of a document, an editing process may be enabled where edits to the existing document may be generated by the information system and submitted to the blockchain, causing corresponding transactions to be stored on the blockchain. Additional transactions that are generated based on the edits may effectively provide a proof of custody or audit trail for the document. After completion of the editing process (or if no editing is needed), the document may be finalized and then approved for release by one or more designated approvers. The approvers may cryptographically "approve" the document for release by providing their cryptographic signature to a blockchain transaction.

Once a document is approved for release, a final transaction is generated and submitted to the blockchain. This blockchain transaction may have additional requirements to "unlock" the document or information provided therein (e.g., a specific time at which the information may be available). Once the final transaction is submitted, the intended recipients of the document may monitor the blockchain to determine if they can now access the document stored in the transaction.

It will be appreciated that the time-aware nature of the scripts or computer programs associated with a given blockchain transaction (which are enriched based on meta-data entered by users associated with the release of a document) in combination with the requirement for the cryptographic signatures of the approvers can assist in providing time-sensitive or confidential information to the general public (or at least an intended recipient group) in a secure and reliable manner.

Figure 1:
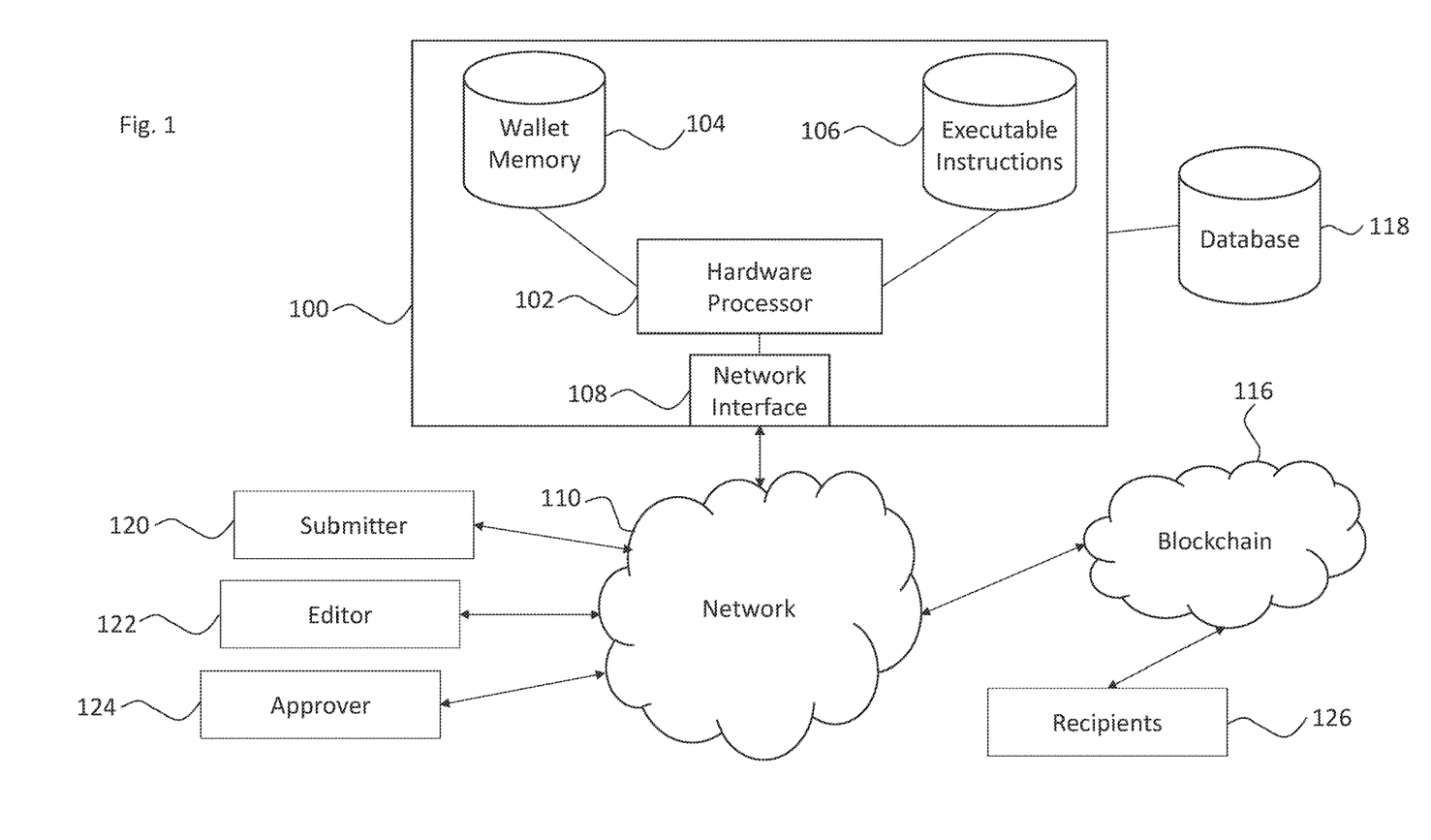
FIG. 1 illustrates a non-limiting example function block diagram of a computer-implemented information system that interfaces with a blockchain according to certain example embodiments.
Figure 2:
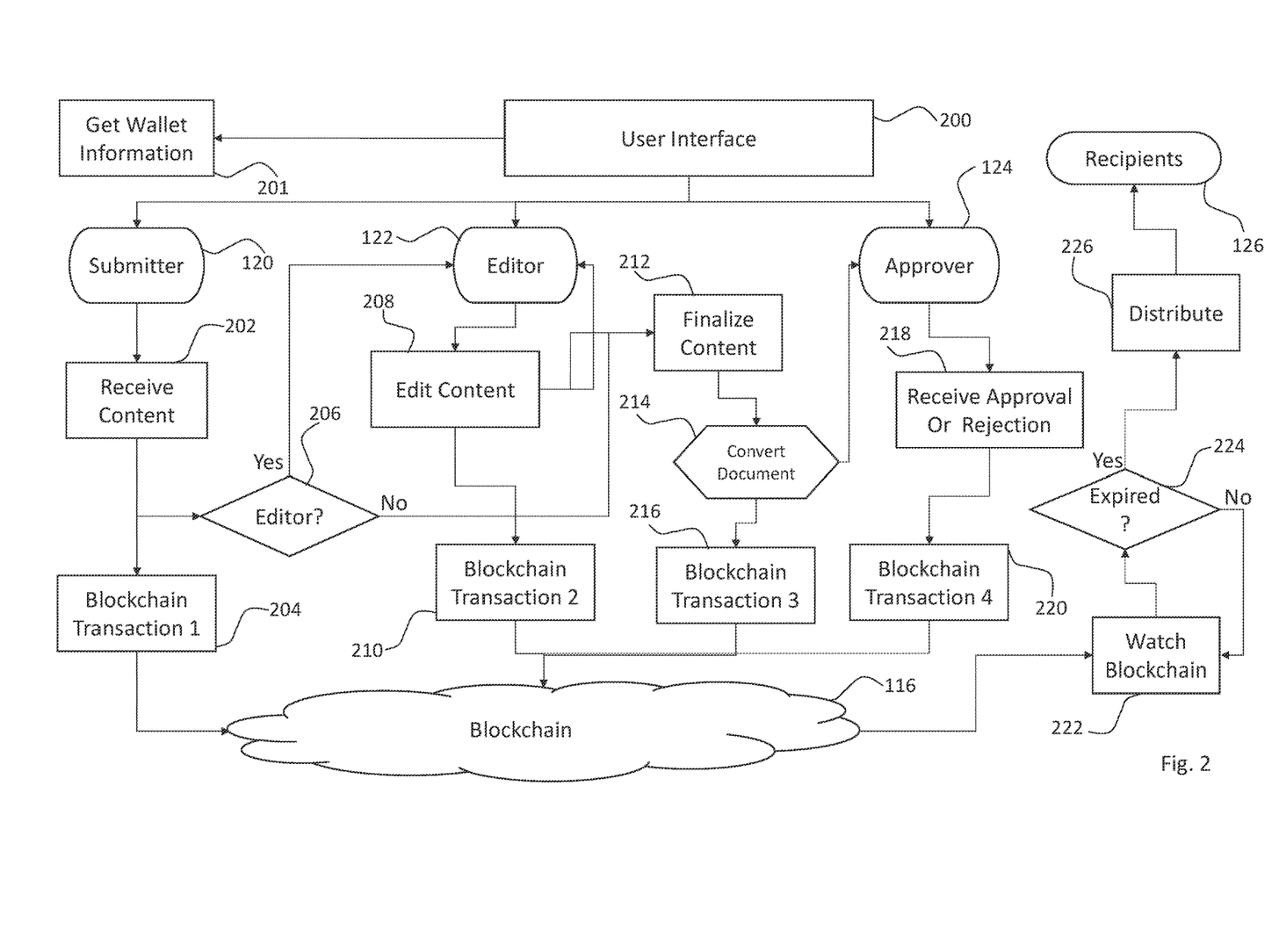
FIG. 2 is a flow chart of an example computerized process of securing and disseminating time sensitive information using an example blockchain according to certain example embodiments.
Figure 3A:
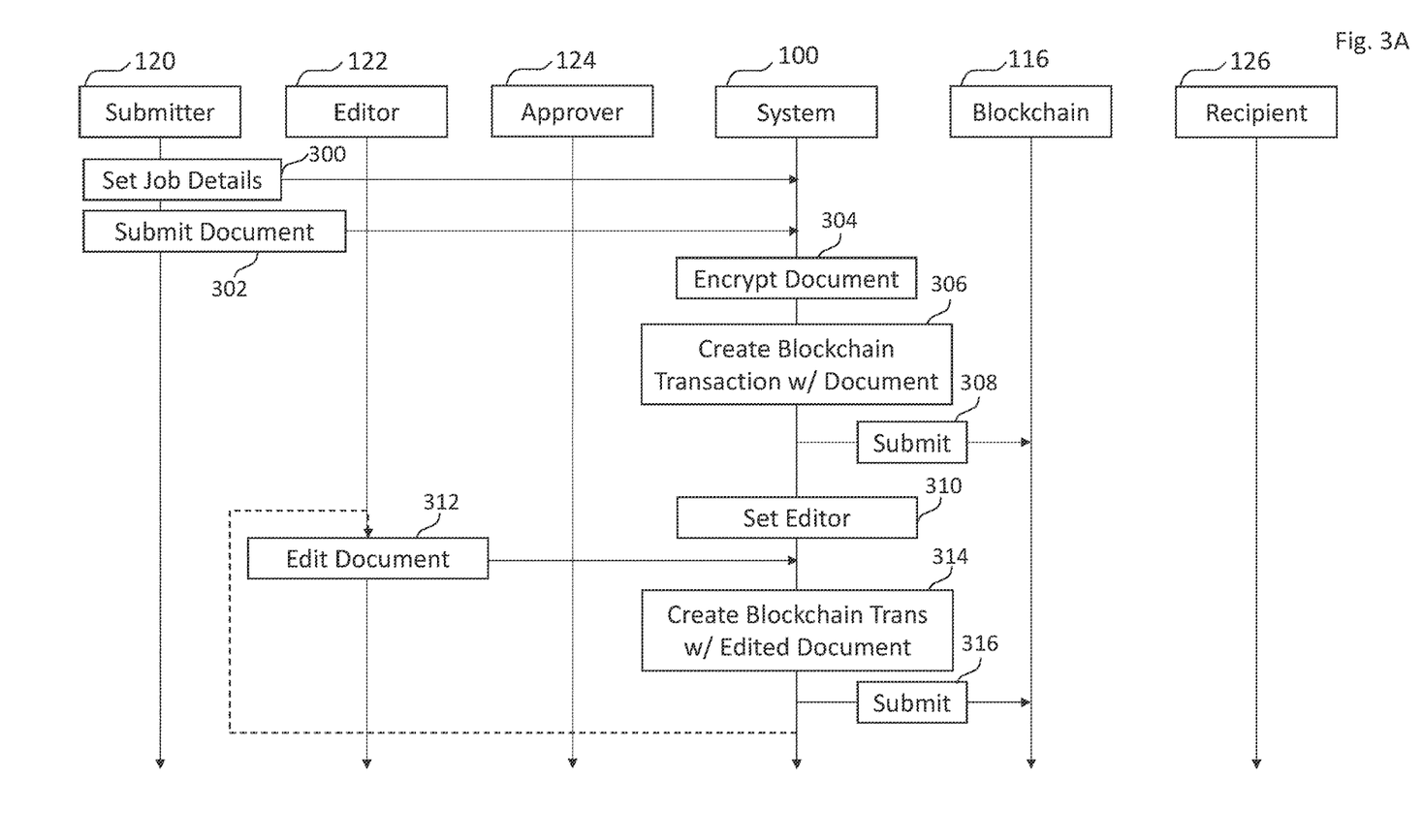
FIGS. 3A and 3B are signal diagrams showing a process for securing and disseminating time sensitive information using an example blockchain according to certain example embodiments.
Figure 3B:
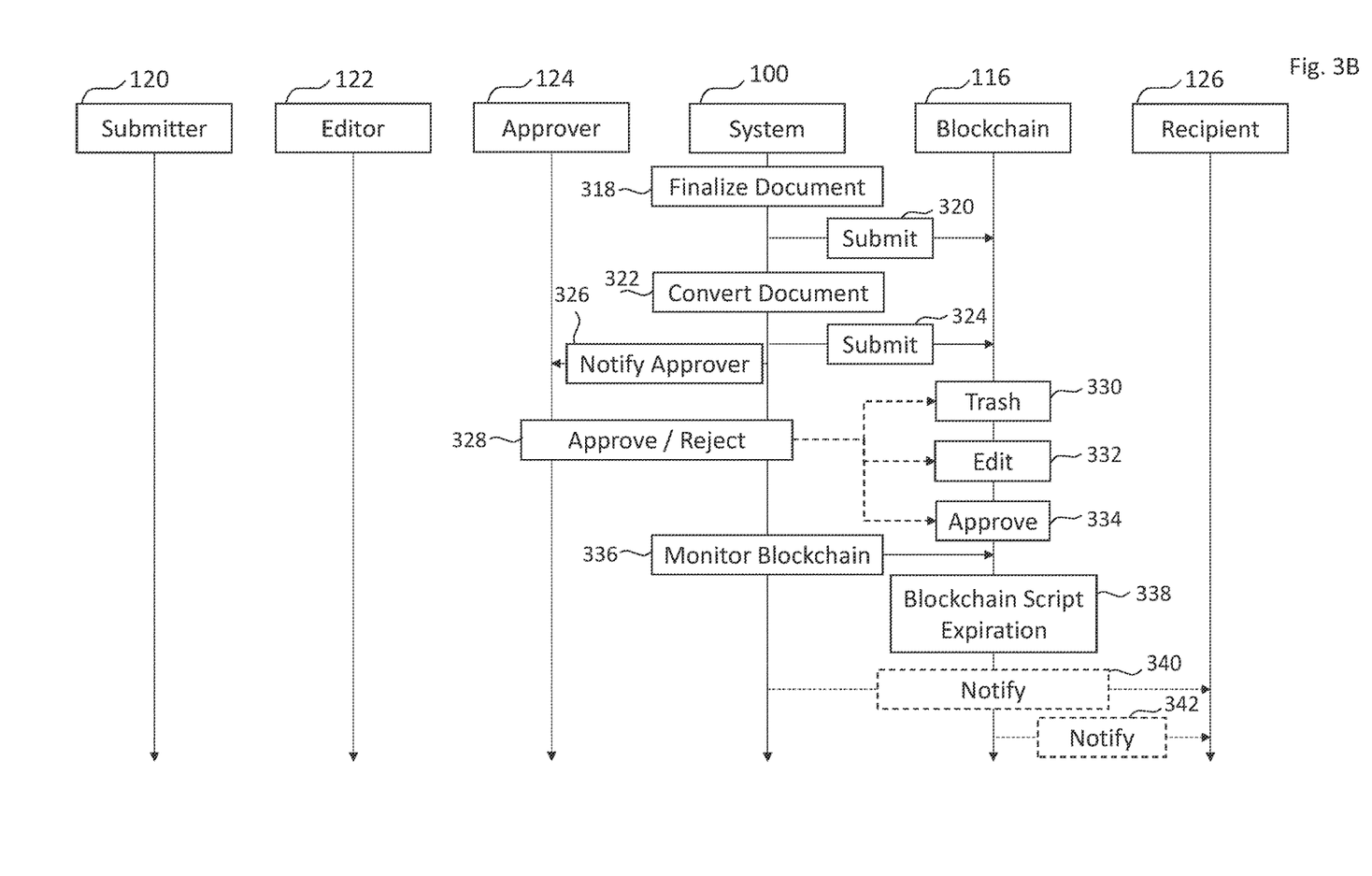
Figure 4:
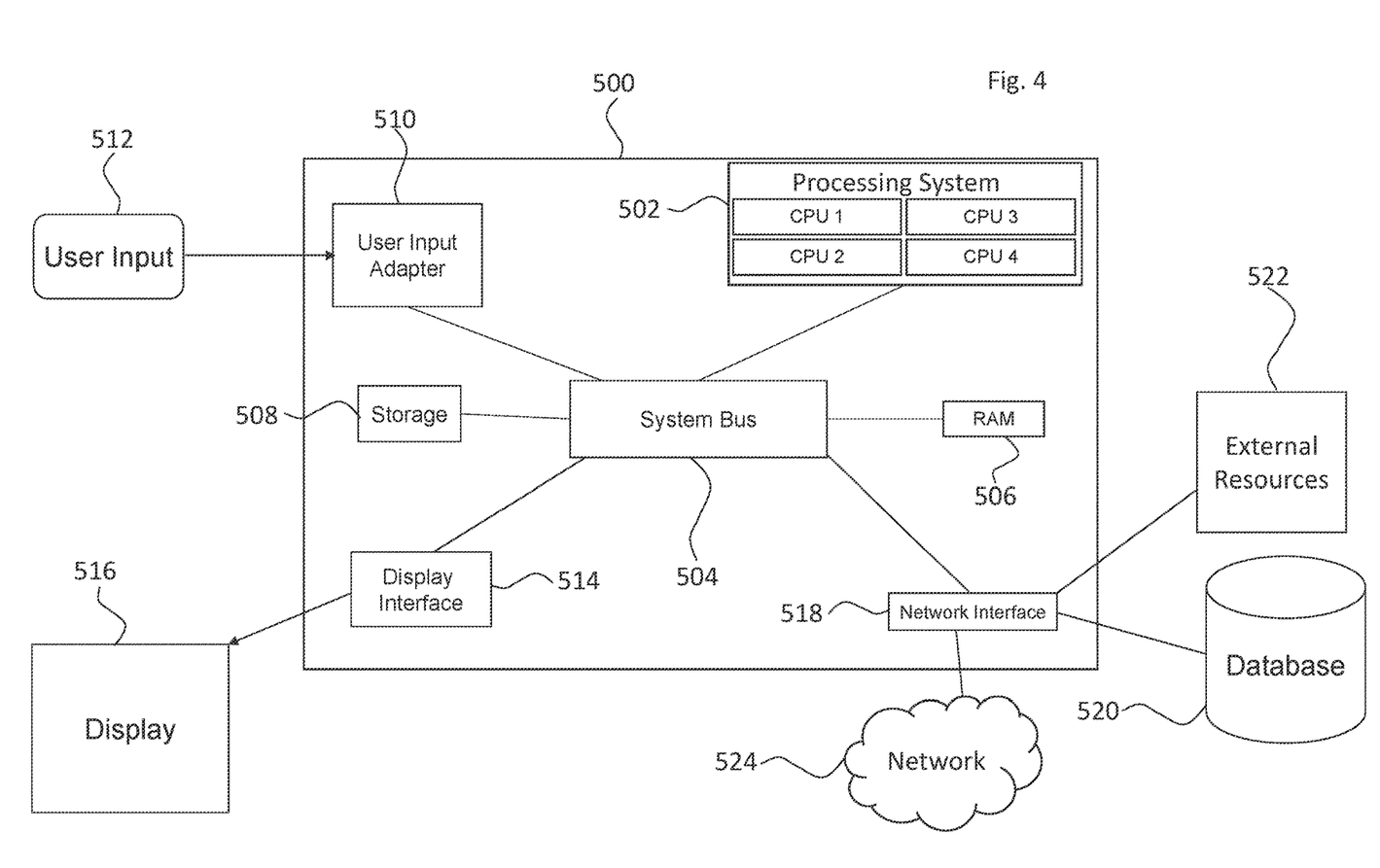
FIG. 4 is an example computer system according to certain example embodiments.

FIG. 1 shows an example information system in function-block form where the functions may be implemented on, for example, the example computer system shown in FIG. 4. FIG. 2 is an example process that shows how a submitter, editor, and approver cause various interactions with the blockchain based on the originally submitted document. The example process illustrates example steps for how a document is eventually released to an intended recipient group. FIGS. 3A and 3B are signal diagram versions of the process shown in FIG. 2.

Description of FIG. 1

By way of introduction, FIG. 1 illustrates a non-limiting example function block diagram of a computer-implemented information system 100 (referred to as "information system" herein) that interfaces with blockchain 116 according to certain example embodiments.

Submitter system 120, editor system 122, and approver system 124 are computer systems (either different computer systems or the same computer system) controlled by respective submitter, editor, and approver users (which may be referred to simply as submitter, editor, and approver) that communicate over an electronic data communications network 110 with information system 100. In certain example embodiments, the submitter, editor, and approver are computer programs (e.g., automated programs) that provide the input and/or functionality associated with the submitter, editor, and approver. The systems that communicate with the information system 100 may be personal computers, mobile devices, automated computer systems, or the like and may include or implement a client-side application that is designed and programmed to communicate with information system 100. In certain examples, the electronic communication may take the form of a web site or the like and a web page may be rendered based on a mark-up language (e.g., HTML) transmitted from a web server that is part of, or associated with, information system 100.

In certain example embodiments, a submitter user (e.g. a user that is using the submitter system 120) (also referred to herein as a "submitter") may be a user that submits the initial document and associated meta-data (e.g., information on when the document is to be released, who or which recipients are to have direct access to the document on the blockchain, how the document will be made available, etc. . . . ). In certain example embodiments, each submitter user may have a corresponding digital wallet identifier and corresponding private key. This information may allow the submitter user to interface with the blockchain 116 (either directly or via information system 100).

In certain example embodiments, an editor user (or "editor") is a user that provides a value added service and is allowed to modify the document originally submitted by the submitter user. In certain instances, the editor user may belong to a different organization or company from the submitter. For example, and editor user may be a lawyer from a law firm or an accountant from an accounting firm. Like the submitter user, the editor user (e.g., each editor user) may have a corresponding digital wallet with an associated private key.

In certain example embodiments, an approver user (or "approver") is a user that can approve a document that has been submitted (and perhaps edited) for dissemination to intended recipients. An approver user may be issued a digital wallet that includes information that allows the approver user to see a document and other information associated with the document, such as the document's scheduled time, the list of (other) approvers of the document, and the overall approval status of the document (e.g., how long until it is "released"). The approver user may use their associated wallet and private key to approve or reject a given document that has been included into a blockchain transaction.

In certain example embodiments, the above submitter, editor, and approver user may be roles that may be assigned to a given user account and/or associated digital wallet. In certain example embodiments, a given user may have two or three of the above roles assigned to that user.

Information system 100 includes network interface 108 configured to receive electronic data messages that make up a submitted document, file, or other electronic information submitted from submitter system 120. Electronic data messages may also compose commands or remote procedure calls (e.g., via an application programming interface or API) that are used by, for example, the submitter, editor, or approver for submitting, editing, or approving a document.

It should be noted that the term document, as used herein, and unless otherwise noted, is intended to encompass electric documents, electronic files, and other electronic information or content that may be submitted to the information system 100 and the blockchain 116. As used herein, documents may include audio files, video files, spreadsheets, text documents, image files, files in proprietary formats (e.g., PDF), or files in open standard formats (e.g., XML, etc. . . . ). In certain example embodiments, a user (e.g., either the editor or submitter) may upload or edit the digital content through a web interface. For example, the submitter may type the digital content into a text box or other web-based control. The digital content may be stored to the blockchain (e.g., either in text form, XML, html, etc. . . . ) and then later edited by an editor through the same web interface. In short, there may be different options for how customers (e.g., the submitter, editor, and approver) interact with the content or document that is set to be "released" to the recipients (or recipient systems 126).

Information system 100 includes a hardware processor 102 (e.g., a CPU, GPU, etc. . . . ) that executes instructions 106 stored in electronic memory (e.g., registers, RAM, other volatile or non-volatile memory, etc. . . . ) of information system 100.

Wallet memory 104 stores digital wallet accounts that are used for interacting with blockchain 116. Wallet memory may be stored in stored in a computer storage system (e.g., that may include storage 508, RAM 506, and/or other electronic storage that is part of system 100 or accessible to system 100). Wallet memory includes digital wallet accounts for the submitter, the editor, the approver, each of the recipients 126, and possibly the entity running the information system 100. A digital wallet is a data structure that stores data that is accessed via software and hardware (or specifically designed hardware) that allows the generation of transactions that use, for example, a blockchain. The digital wallet data structure can include a private key (e.g., that is only known to the holder of the wallet) and a series of identifiers (sometimes called wallet identifiers or walletIDs herein) that have been generated based on the private key. These identifiers are "public" and can used to allow other users to "send" transactions, which are recorded on the blockchain, to that identifier—and thus the user associated with the wallet from which the identifier is linked to.

For example, a submitter that uploads a new document will "send" a block transaction to a wallet identifier associated with an editor (or an approver(s) if no editor is required). That blockchain transaction may only be unlocked by using the private key of the editor from which the editor's public wallet identifier was generated (e.g., using a hash algorithm). When the transaction is "unlocked" by the editor, a new blockchain transaction is generated and sent to a wallet identifier associated with an approver (or another editor).

Accordingly, software associated with the wallet may be used to query the blockchain to determine what unspent transactions (e.g., those transaction outputs not used as inputs for another transaction) are associated with the identifiers of a given wallet. Such software may then present a holistic view of what is "owned" by the holder of the wallet. For example, a blockchain transaction that has an un-approved earning report associated with it may be owned by the approver (or approvers). Other transactions that have been un-approved by the indicated approver may also be displayed as part of that user's "wallet." Naturally, the publically shown identifiers associated with those transactions may all be unique due to the way the wallet identifiers are generated based on the private keys of each wallet. Thus, it may be impossible (or at least computationally very difficult) to tell what private key (e.g., which wallet) is associated with which transaction.

In certain example embodiments, a digital wallet and its contents (e.g., private key and generated identifiers) are stored on a user controlled device (e.g., submitter system 120, editor system 122, or approver system 124) and these systems may transmit wallet identifiers and/or private key information to information system 100 for interacting with blockchain 116. Various elements of the wallet may thus be provided on different computer system (e.g., a mobile device of a user, a user's desktop computer system, the information system 100, or another third party system—e.g., a cloud based system that stores digital wallets and the information therein). In certain example embodiments, wallet identifiers (and/or the private key of the wallet) that are stored in wallet memory 104 may allow information system 100 to interact with blockchain 116 on behalf of the owner of the wallet.

Blockchain 116 is a data structure that is provided or stored on a blockchain computer system (not shown) that may include a plurality of computer devices (e.g., as shown in FIG. 5) that communicate with each other over an electronic data communications network. Each node of the blockchain computer system may store a copy (or a portion) of the blockchain 116. Whenever it is described in this document that data (whether a transaction, or any other type of data) is stored on the blockchain, such storing may include: the initial reception of the transaction to the blockchain 116 (or one of the nodes therein); the cryptographic verification of the transaction (e.g., its incorporation into a "block" of the blockchain); and/or a determination that the transaction is now computationally immutable (e.g., multiple blocks have been linked to the blockchain that incorporated the at-issue transaction).

Information system 100 may also be coupled to database 118, which may hold account information (e.g., security credentials that allow the submitter, editor, or approver to interact with the information system 100), workflow information (e.g., which approvers are needed for a given document to be released), group information on recipients that belong to a given group, mappings between such group information and how clients choose to have their submitted information shared with those recipients, and other data.

Description of FIG. 2

FIG. 2 is a flow chart of an example computerized process that secures and disseminates a document using an example blockchain according to certain example embodiments.

As discussed above, information system 100 may enable or provide a user interface (e.g., via the stored computer instructions) to client computer systems. This is represented in FIG. 2 as user interface 200. In certain instances, this may be an API or computer program that facilitates or provides a user interface for a user(s) to perform submission, editing, and approving tasks. In certain example embodiments, recipients (e.g., via recipient systems 126) may use the user interface 200 to view documents that have been "released" via the blockchain 116.

Submitter system 120 authenticates or otherwise logs into information system 100. The user interface 200 may send or present a number of different options for a submitter user to create one or more types of jobs (e.g., a job being a planned release of a document at some future time and date). Some of the different jobs may include press releases, earnings releases, regulatory filings, general company announcements, and the like. These jobs may come with prepopulated options (e.g., that earning releases always occur at a certain time or that regulatory filings need to be edited and/or approved by a law firm, etc.) for the given job. In certain examples, a user may create a custom job for a document.

Once a particular type of job is selected by the submitter, the submitter can then upload or otherwise provide both the document that is to be released and meta-data associated with the document. In certain example embodiments, the content (e.g. that will become the released document) may be provided through the user interface 200. For example, the submitter may manually enter the text into a textbox that is part of the user interface 200 (e.g., that is displayed in a web browser on submitter system 120).

The submitter also enters or specifies meta-data associated with the document and/or job. This may include, but is not limited to, whether an editor is needed for the job, the schedule at which the document is to be disseminated, the intended recipient(s) for the document, and/or the multi-signature (multi-sig) requirements for the smart contract (e.g., who is required to approve the finalized version of the document). In certain example embodiments, multi-sig may refer to a requirement that more than one party (e.g., more than one approver) is required to approve a transaction before the document is released to the intended recipients. In other words, multiple approvers may be required to "sign" or unlock (e.g., by using their corresponding private keys) a blockchain transaction that is holding the to-be-released document. This multi-signature requirement may be part of smart-contract that also specifies the time that the transaction will be unlocked and viewed by the intended recipients. As used herein, a smart contract is a computer program (or script) that enforces one or more programmatic rules for a corresponding blockchain transaction. These rules may be mutually agreed upon by the parties associated with the blockchain transaction.

The above information that is entered by the submitter user on the submitter system 120 is received by the information system 100 at step 202. Once the information is received, the system proceeds to interact with the blockchain in step 204 where the first (of perhaps many) blockchain transactions associated with this job is generated and submitted to the blockchain 116. In particular, the information processing system may calculate the cryptographic hash for the content or document associated with the job and store that hash and document on the blockchain 116 as part of the unspent transaction(s). In certain example embodiments, the blockchain could be a public blockchain that is part of the bitcoin blockchain. Alternatively or additionally, a colored coin (e.g., part of the OpenAsset Protocol) may be used. In other example embodiments, a privately operated blockchain (e.g., a blockchain network that does not allow anyone of the general public to join) may be used.

In any event, it will be appreciated that once block transaction 204 is generated and submitted to blockchain 116 that any subsequent modification to the document associated with this transaction will be saved as a separate blockchain transaction. This ensures that a complete audit trail (from submission, up through and including distribution to the intended recipients) is kept for all modifications to the document. In certain example embodiments, a user interface may be configured to show a graphical representation of a complete audit trail of the blockchain transactions from submission of the document to "release" of the document to the recipients. This graphical representation may include showing which users made edits to the document and when those edits where made. The graphical representation may include which approvers were to approve the document and when those approvals were made. The graphical representation may include a listing of which recipients have accessed or have "received" the document.

In certain example embodiments, the document or content may be encrypted before being incorporated into the transactions saved to blockchain 116. Such an implementation may be preferable in cases where the information is especially time-sensitive or confidential until its public release.

The additional meta-data information entered by the submitter and received in step 202 (e.g., multi-sig requirements, the schedule of when the document is to be "released," the recipients that are to receive the documents) all become input for the smart contract that is part of the generated blockchain transaction in step 204.

In step 206 (which may occur in parallel or sequentially with step 204), a determination is made whether an editor is needed. In certain instances, this information may be assigned automatically (e.g., irrespective of the meta-data provided by the submitter) by the information system 100. For example, the database of the information system 100 may store various rules that indicate, for example, all earning reports are required to be submitted to an auditor for potential editing. This type of rule may be automatically enforced by the information system 100. In other examples, the submitter may specify (as part of the entered metadata) that an editor will be assigned the job and can edit the document.

If an editor is required, then the job is assigned to an editor. If an editor is required, then the user interface of the information system 100 provides a suitable user interface to allow an editor user of editor system 122 to edit the document associated with this job in step 208.

As part of the editing process, the information system 100 may capture any and all modifications to the document that are entered by the editor user. In certain example embodiments, each editor user may have their own digital wallet and corresponding private (and public) key which may be obtained through the get wallet information step 201. The revised document and/or the changes made by the editor user may be used to create another blockchain transaction in step 210.

An example up until this point may be as follows. When a submitter submits a document, the created transaction may use the public key of the editor that is to edit the document. The blockchain transaction (and the document carried by that transaction) are signed by the editor's public key and can thus only be "opened" by the private key held by the editor. When the editor begins editing the document, the private key for the editor is used to unlock the document. When the editing is complete (or saved), a new blockchain transaction is created. In certain examples, the transaction may be signed with the public key of an approver. In certain examples, this new transaction may be signed with the public key of another editor, or perhaps the same editor (e.g., they are not done editing the document). As part of the generation of a new blockchain transaction, the newly revised document may be cryptographically hashed and then the new document and its hash may be stored on the blockchain via the new blockchain transaction. In other examples, the modifications to the document may be hashed and then stored as part of a blockchain transaction. These datasets may be stored as unspent transactions on the blockchain.

In certain example embodiments, the editor process may repeat (e.g., multiple editors may be involved and may make multiple edits). This is represented in FIG. 2 by the connection between step 208 and editor 122. Each of the edits made to the document will be stored as a separate blockchain transaction.

In step 212, the job is "finalized" by either the submitter user or the editor user. In other words, if no editor is needed, then the submitter may finalize the job. If an editor is editing the document, then they may edit the document multiple times until finalizing at step 212. In certain example embodiments, finalization of the document may generate a new blockchain transaction (e.g., 216).

After being finalized, then the document is converted at step 214 by the information system 100 into a desired format that is suitable for distribution to the intended recipients. This format may include various machine readable formats such as XML, HTML, PDF, etc., which are suitable for consumption by the recipients. The converted document (and hashes thereof) are included in blockchain transaction 216 that is generated for the finalized (and converted) set of data.

After the conversion, information system 100 moves the job to the next stage—approval. Here, information system 100 notifies all required approving entities and requests approval of the release of the document at step 218.

Approving users use their digital wallets to approve or reject the document that is to be released. If the document is rejected, the approver may provide a reason and send the document back to an editor (e.g., by signing a new transaction with the public key of the editor). Alternatively, a rejection may result in the document or job being permanently rejected. For example, the information system 100 may maintain a digital wallet that acts a trash bin where documents that are not to be released are signed with the public key the digital wallet associated with this trash bin. Once a document is rejected in this manner, it may (effectively) be shredded as only the information system 100 will have access to the key that could "unlock" the document that is present in the blockchain transaction.

Alternatively, an approver may approve the document for release. In this case, another blockchain transaction 220 is created that is signed by the digital wallet associated with the approver. This signature may complete one part (or the whole) of the smart contract associated with the document.

In steps 222 and 224, the information system 100 continuously monitors blockchain 116 for the smart contract maturity or expiration. A smart contract associated with a document matures or expires when all the conditions for the approval are met (this includes having the requisite approvers approve the document and having the indicated time for the smart contract expire).

If a smart contract associated with the blockchain does mature, then the information system 100 may read the data associated with the document from the blockchain, and notify the intended recipients in step 226. In certain example embodiments, the recipients may monitor the blockchain directly and read the blockchain transaction that contains the finalized and approved document directly therefrom (e.g., because the smart contract allows such an action). In certain examples, the document may be delivered to the intended recipients via email or other delivery system. In certain examples, the system 100 may upload or post the document to a website that the recipients can access. This completes the "job" that was initially started by the submitter.

In certain example embodiments, the recipients may each have a wallet (e.g. that is stored in wallet memory 104). Once a job is completed (or a smart contract matures), another blockchain transaction may be generated that makes each of the intended recipients the owner (e.g., a transaction will be signed using the recipients' public keys) of the same data. Thus, when a recipient opens their wallet (or a transaction is now "owned" by that wallet) they will be able to read the document contained in the transaction. In certain examples, approval by an approver may thus generate a one-to-many transaction, where the "many" side of the transaction is each one of the recipients.

In certain example embodiments, for any of the different blockchain transactions herein, different portions of a document may be encrypted using different encryption keys. Thus, for example, when an editor is assigned to edit and review a document, some portions of that document may be encrypted using a key that is not available to the editor. The document may thus be segmented into different portions that are displayed to corresponding users on a need to know basis.

Description of FIGS. 3A-3B

FIGS. 3A and 3B show the process shown in FIG. 2 in the form of a signal diagram. The elements and functionality discussed in connection with FIG. 2 thus apply to FIGS. 3A-3B and vice versa.

In step 300, the submitter system 120 receives user input that indicates the job details for the release of a document, and stores the received user input. As discussed herein the job details may include setting the release time, the intended recipients, the editors and/or approvers, etc. . . . . Step 300 also includes the submitter system 120 transmitting (or otherwise providing) the job details to the system 100.

At step 302, the submitter system 120 transmits (or otherwise provides) the document to the system 100.

Once the document is received by the system 100 it is encrypted at step 304. At step 306 a blockchain transaction is created that includes the encrypted document or a hash thereof, this transaction is then submitted to the blockchain 116 at step 308. After being received at the blockchain 116, the transaction is stored in the blockchain 116. In certain examples, the transaction is "from" the submitter and "to" one or more editors. In certain examples, the transaction is 'to' one or more approvers.

In the case of an editor being required, the editor is set and then notified at step 310. In certain examples, an editor is notified via email or the like that a document is ready to be reviewed and edited.

At step 312 the editor edits the document by accessing the document that was stored in accordance with the submitted blockchain transaction at 308. Each edit session by the editor system 122 may correspondingly cause the creation of a blockchain transaction in step 314 for the edited document. This new blockchain transaction is then submitted at step 316 to the blockchain 116 where it is stored therein. Depending on the nature of the job, the transaction that is created at step 314 may be from the editor back to the same editor (e.g., in the case of further edits being required), may be from the editor to another editor(s) (e.g., as represented by the dashed line back to 312), or may be from the editor to one or more approvers. Different editors may use the same editor system 122 or a different editor system (e.g., a different computer system).

After editing, the system 100 may determine (e.g., in accordance with the set job details) that the document no longer is being edited and then finalize the document at step 318. Finalizing the document may cause the creation and submission of another blockchain transaction by the system 100 at step 320 to the blockchain 116. Accordingly, the finalized document may be incorporated into the blockchain 116 (e.g., by being cryptographically verified).

After finalizing the document, the system 100 may also convert, at step 322, the document into a format that will be used for disseminating the document to the recipients. The converted document may also be saved to the blockchain 116. It will be appreciated that each successive blockchain transaction for a document may refer back to a prior blockchain transaction for that document (e.g., the unspent "outputs" of one blockchain transaction are used as "inputs" for a successive blockchain transaction). This may facilitate the creation and stability of an audit trail from the submission of the initial document through the eventual dissemination of the document to the recipients.

In any event, once the document has been finalized and is in the format that will be disseminated, the approvers will be notified at step 326. In certain examples, the notification may be a message that is delivered to the approver system 124 and in other examples the notification may be, for example, an email that is sent to the email address associated with an approver.

At step 328, the approver may approve 334, reject and discard 330, or reject and request further modifications 332 via the approver system 124. If the approver completely rejects the document 330 (e.g., via a reject command provided from the approver system 124) another blockchain transaction may be generated "to" a special trash address that is on the blockchain. The key for this address may be held by the system 100 such that no outside parties (or perhaps even the system 100) could then unlock the document (or the transaction that contains the document) because it is signed by a public key for which no party has access to.

In the case of rejection and further modifications 332 (e.g., via an edit command provided from the approver system 124), another blockchain transaction may be generated (e.g., from the approver to an editor) that effectively returns the process to step 312 (or another editor of the approver's choosing). The process would then repeat from step 312.

Finally, the approver may also approve the document for release at 334 (e.g., via an approval command provided from the approver system 124). When an approver approves the release of a document they may effectively be signing (from the perspective of the blockchain) the final transaction. Once signed, then any other conditions associated with the transaction (e.g., a timed release) would then wait to be fulfilled at 338.

In the meantime, the system 100 monitors the blockchain 116 for when the script associated with this "final" transaction has been fulfilled in step 336. If it has been fulfilled, then the system 100 may notify (at step 340) the recipients 126 that the document is now available on the blockchain 116 and/or recipient systems 126 may directly monitor the blockchain 116 (at step 342) such that blockchain 116 effectively notifies the recipients 126 of the expiration of the script associated with the final blockchain transaction. In certain example embodiments, the document may be made available by having the system 100 send an email or other communication to the recipients with the document. Accordingly, the document that was initially uploaded may be secured and timely delivered to the intended recipients.

Description of FIG. 4

FIG. 4 is a block diagram of an exemplary computing system 500 according to certain example embodiments (e.g., an information system 100, the submitter system 120, editor system 122, approver system 124, as described in connection with FIGS. 1 and 2 or a computing node that is part of a distributed computing system used to process and maintain the blockchain 116, etc. . . . ). Computing system 500 includes a processing system 502 with CPU 1, CPU 2, CPU 3, CPU 4, a system bus 504 that communicates with RAM 506, and storage 508. The storage 508 can be magnetic, flash based (e.g., for a mobile client device), solid state, or other storage technology. A storage system may comprise cache memory that are on the computer chip of CPU 1, RAM 506, storage 508, hardware registers, external systems 522, and the like.

In certain example embodiments, the processing system 502 is programmed (e.g., via a series of program instructions) to carry out the process and/or one or more of the steps/actions shown in FIG. 2 and/or FIGS. 3A and 3B.

In certain example embodiments, the processing system is programmed to implement functionality associated with user interface 200. This may include a web server that serves up html and other web content to client computer systems or include, software interfaces (e.g., APIs) that receive remote procedure calls or service invocations from remote computing devices. Additional functionality may also be programmatically implemented for an example computing system.

The system bus 504 communicates with user input adapter 510 (e.g., PS/2, USB interface, or the like) that allows users in input commands to computing system 500 via a user input device 512 (e.g., a keyboard, mouse, touch panel, or the like). The results of the processing may be displayed to a user on a display 516 (e.g., an LCD) via display interface 514 (e.g., a video card or the like). In certain example embodiments, commands to computing system 500 may be provided via network interface 518 (as discussed above). In certain example embodiments, representations a document or content that is part of a job may be displayed on display 516 or a display that is communicatively coupled to computing system 500 via network interface 518. In certain example embodiments, content for a job being managed by the information system 100 may be directly entered via user input device 512. Certain examples embodiments may include one or more user input adapters (e.g., a keyboard and mouse). Certain example embodiments may include one or more output devices (e.g. multiple monitors and/or multiple display interfaces).

The computing system 500 may also include a network interface 518 (e.g., a transceiver) to facilitate wired (e.g., Ethernet—802.3x) and/or wireless communication (WiFi/802.11x protocols, cellular technology, and the like) with external systems 522, databases 520, and other systems via network 524. External systems 522 may include other processing systems, systems that provide third party services, etc. External systems 522 may be client devices or server systems.

External systems 522 may also include network attached storage (NAS) to hold large amounts of data. External systems, along with the internal storage and memory, may form a storage system for storing and maintaining information (e.g., job information, documents, user information, etc. . . . ). Such a system may communicate with users and/or other computing systems. The database 520 may include relational, object orientated, or other types of databases for storing information.

In certain example embodiments, the storage system of the computer system may store instructions that cause one or more processors (e.g., the processing system) of the computer system to perform each or any combination of actions described herein as performed by, for example, an information system, a client computer system, and/or an external computer system.

In certain example embodiments, a method can include each or any combination of actions described herein as performed by a computer system, including the information systems of FIGS. 1 and 2. In certain example embodiments, a method can include each or any combination of actions described herein as performed by a user device (e.g., submitter system 120, editor system 122, approver system 124, etc. . . . ).

In certain example embodiments, a computing system includes each or any combination of the components shown as included in the exemplary computing system 500 of FIG. 4, where the each or any combination of the components are configured to perform the method(s) in the above paragraph(s) or the processes, steps, and/or actions shown in FIG. 2, 3A, or 3B.

In certain example embodiments, a processor is configured or programmed to perform the method(s) above and/or the processes, steps, and/or actions shown in FIG. 2, 3A, or 3B.

Certain example embodiments described herein may incorporate the blockchain techniques discussed in U.S. Application No. 62/270,560 or U.S. application Ser. No. 15/200,756, the entire contents of each of which are hereby incorporated by reference.

In other words, the processes, techniques, and the like, described herein (for client devices, server, information system, distributed computing system, and/or controller systems) may be implemented on a computing system. Such implementations may then configure or program the processing system to carry out aspects according to certain example embodiments. It will be appreciated that other architecture types may be used. For example, a single CPU may be used instead of multiple CPUS. Alternatively, a processing system may include multiple CPU "cores." Further, the various elements shown in connection with FIG. 4 may be included into one cohesive physical structure (e.g., such as a tablet device). The components and functionality shown in FIGS. 1-3B may be implemented on or in conjunction with the example computing system shown in FIG. 4 (e.g., to thereby create a specific purpose computing machine).

Individual function or process blocks are shown in the figures. Those skilled in the art will appreciate that the functions of those blocks may be implemented using individual hardware circuits, using software programs and data in conjunction with a suitably programmed hardware, using applications specific integrated circuitry (ASIC), and/or using one or more digital signal processors (DSPs). The software program instructions and data may be stored on non-transitory computer-readable storage medium and when the instructions are executed by a computer, or other suitable hardware processor, control the computer or hardware processor to perform the functionality defined in the program instructions.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred. A description of a process is a description of an apparatus for performing the process. The apparatus that performs the process may include, e.g., a processor and those input devices and output devices that are appropriate to perform the process.

Various forms of non-transitory, computer-readable media may be involved in carrying data (e.g., sequences of instructions) to a processor. For example, data may be (i) delivered from RAM or cache to a processor; (ii) or instructions for a process may be stored in an instruction register and loaded by a processor. Instructions and/or data may be carried or delivery over other types of transmission mediums (e.g., wire, wireless, optical, etc.) and/or transmitted according to numerous formats, standards or protocols, such as Ethernet (or IEEE 802.3), SAP, ATP, Bluetooth, and TCP/IP, TDMA, CDMA, 3G, etc.; Such transitory signals may be coupled to non-transitory media (e.g., RAM, cache, hard drive, a receiver, registers, etc. . . . ), thus transitory signals will be coupled to non-transitory media. The transitory and non-transitory signals, instructions, and/or data, may be encrypted to ensure privacy or prevent fraud in any of a variety of ways well known in the art.

Technical Advantages of Described Subject Matter

In certain example embodiments, an information release system interfaces with a blockchain to facilitate the release of sensitive digital information (e.g. an earnings report, a new release, etc. . . . ) to a group of intended recipients. The incorporation of a blockchain and the digital wallets that are used for transactions on the blockchain advantageously provides security and an audit trail for a given piece of electronic information (e.g., the document to be released). In certain example embodiments, the use of multi-signature functionality (e.g. a blockchain address the requires multiple signature to unencumber a given transaction) provides for a secure and verifiable process that allows users (e.g., the CFO, CEO, etc. . . . ) to review a document before the document is released to the recipients. The multi-signature functionality cryptographically guarantees that two or more private keys must be used before the document is released to the intended recipients. The incorporated audit trail functionality also provides a cryptographic guarantee that the document or content that is approved by the approvers is the same document or content that is then "sent" to the recipients.

The technical features described herein thus improve the security, verifiability, and reliability of an electronic information release (e.g., a custodian, "newswire," or "online news distribution," etc. . . . ) service.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although various embodiments have been shown and described in detail, the claims are not limited to any particular embodiment or example. For example, while blockchain technology is described as being used in a number of embodiments, it should be understood that, in other additional embodiments, one or more other distributed ledger technologies may be used in place of the blockchain technology. Further, while many examples are provided herein in the context of an information release system, it should be understood that the features described herein are equally applicable other types of electronic information processing systems. None of the above description should be read as implying that any particular element, step, range, or function is essential. All structural and functional equivalents to the elements of the above-described preferred embodiment that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, component, or step in this specification is intended to be dedicated to the public.

The invention claimed is:

1. A computer system comprising:
non-transitory computer readable storage configured to store cryptographic data that includes first cryptographic data associated with a submitter for documents and second cryptographic data associated with an approver that for approval of release of documents; and
at least one hardware processor coupled to a memory that is configured to store computer executable instructions configured to cause the at least one hardware processor to perform operations comprising:
processing a document for secure release to a plurality of intended recipients;
generating a first blockchain transaction that is based on: the document to be securely released, and the first cryptographic data that is associated with the submitter;
generating a second blockchain transaction that is cryptographically linked, directly or indirectly, to the first blockchain transaction, wherein the second blockchain transaction is to a blockchain identifier associated with the approver and the second blockchain transaction is based on the document;
submitting the first blockchain transaction and the second blockchain transaction to one or more computing nodes of a distributed blockchain computing system for incorporation into a blockchain; and
generating, based on a received command, a third blockchain transaction based on content to be released, which is or is based on the document that has been approved, wherein the third blockchain transaction is cryptographically linked, directly or indirectly, to both the first transaction and the second blockchain transaction, wherein the third blockchain transaction includes programmatic locking code that includes a plurality of conditions that must be satisfied, wherein a plurality of intended recipients cannot access the content to be released on which the third blockchain transaction is based until each of the plurality of conditions that are part of the programmatic locking code have been satisfied.

2. The computer system of claim 1, wherein:
the cryptographic data includes third cryptographic data associated with at least one editor that is associated editing documents, and
the operations further comprise:
while a blockchain transaction for the document is associated with the third cryptographic data for the editor, receiving data that is based on edits made to the document;
generating a fourth blockchain transaction based on the edits of the document and/or an edited version of the document; and
submitting the fourth blockchain transaction to one or more computing nodes of the distributed blockchain computing system for incorporation into the blockchain, wherein the fourth blockchain transaction is cryptographically linked, directly or indirectly, to the first and, second blockchain transaction,
wherein the third blockchain transaction is cryptographically linked to the fourth blockchain transaction.

3. The computer system of claim 2, wherein the fourth blockchain is associated with a blockchain identifier of a second editor, and
the operations further comprise:
generating a fifth blockchain transaction based on edits to the document that have been made by the in association with the second editor; and
submitting the fifth blockchain transaction to one or more computing nodes of the distributed blockchain computing system, wherein the fifth blockchain transaction is cryptographically linked, directly or indirectly, to the first, second, and fourth blockchain transactions.

4. The computer system of claim 1, wherein the operations further comprise:
communicating, based on satisfaction of all of the plurality of conditions, the content to a web server that provides access to the content via a website for at least some of the plurality of intended recipients.

5. The computer system of claim 1, wherein the operations further comprise:
generating, based on satisfaction of all of the plurality of conditions, an email that includes the content or a document based on the content; and
causing the email to be communicated to at least some of the plurality of intended recipients.

6. The computer system of claim 1, wherein the operations further comprise:
when a blockchain transaction is associated with the second cryptographic data of the approver, processing a reject command that has been received in connection with the approver.

7. The computer system of claim 6, wherein the operations further comprise:
based on the rejection command, generating and submitting a further blockchain transaction to one or more computing nodes of the distributed blockchain computing system, wherein the further blockchain transaction is to a blockchain address that is not associated with any of the plurality of intended recipients.

8. The computer system of claim 7, wherein the blockchain address is an address associated with an editor.

9. The computer system of claim 7, wherein the blockchain address is for a trash blockchain address that is not associated with any submitter, editor, approver, or any of the plurality of intended recipients.

10. The computer system of claim 1, wherein third blockchain transaction is generated based on multiple different commands that have been received from a plurality of different approvers,
wherein each of multiple ones of the plurality of conditions are associated with a respective one of the plurality of different approvers and at least one of the plurality of conditions is a timed-release condition.

11. The computer system of claim 1, wherein the content to be released is the document that has been processed for secure release and the third blockchain transaction includes the document that is to be securely released to the plurality of intended recipients.

12. The computer system of claim 1, wherein the content to be released is a modified version of the document that has been processed for secure release that has been further edited and/or converted from the document and the third blockchain transaction includes the version of the document.

13. A method comprising:
accessing cryptographic data that includes first cryptographic data associated with a submitter for documents and second cryptographic data associated with an approver that for approval of release of documents;
processing a received document received in association with the submitter;
generating a first blockchain transaction that is based on: the document to be securely released, and the first cryptographic data that is associated with the submitter;
generating a second blockchain transaction that is cryptographically linked, directly or indirectly, to the first blockchain transaction, wherein the second blockchain transaction is to a blockchain identifier associated with the approver and the second blockchain transaction is based on the document;
submitting the first blockchain transaction and the second blockchain transaction to one or more computing nodes of a distributed blockchain computing system for incorporation into a blockchain; and
generating, based on a received command, a third blockchain transaction based on content to be released, which is or is based on the document that has been approved, wherein the third blockchain transaction is cryptographically linked, directly or indirectly, to both the first transaction and the second blockchain transaction, wherein the third blockchain transaction includes programmatic locking code that includes a plurality of conditions that must be satisfied, wherein a plurality of intended recipients cannot access the content to be released on which the third blockchain transaction is based until each of the plurality of conditions that are part of the programmatic locking code have been satisfied.

14. The method of claim 13, further comprising:
causing, based on execution of the programmatic locking code on the blockchain computer system that unlocks access to the document, or a version thereof, a notification message to be communicated to the plurality of intended recipients.

15. The method of claim 13, wherein third cryptographic data of the cryptographic data is associated with at least one editor, the method further comprising:
receiving, from a computer system associated with the editor, data that is based on edits for the document;
generating a fourth blockchain transaction based on the edits of the document and/or an edited version of the document; and
communicating the fourth blockchain transaction to at least one computing node of the blockchain computing system for incorporation into the blockchain, wherein the fourth blockchain transaction is linked to, directly or indirectly, the first and second blockchain transactions,
wherein the third blockchain transaction is cryptographically linked to the fourth blockchain transaction.

16. The method of claim 13, further comprising:
communicating, based on satisfaction of all of the plurality of conditions, the content to a web server that provides access to the content via a website for at least some of the plurality of intended recipients.

17. The method of claim 13, further comprising:
generating, based on satisfaction of all of the plurality of conditions, an email that includes the content or a document based on the content; and
causing the email to be communicated to at least some of the plurality of intended recipients.

18. The method of claim 13, further comprising:
after at least submission of the first blockchain transaction to the blockchain, receiving a reject command in connection with the document;
based on reception of the reject command, generating a further blockchain transaction, which is cryptographically linked to at least the first blockchain transaction; and
submitting the further blockchain transaction to the blockchain for incorporation therein,
wherein the cryptographic data includes further cryptographic data associated with a trash bin for permanently rejected documents, wherein the further blockchain transaction is signed using a public key from the further cryptographic data.

19. A non-transitory computer readable storage medium storing a computer program for use with a computer system, the computer program causing the computer system to perform operations comprising:
accessing cryptographic data that includes first cryptographic data associated with a submitter for documents and second cryptographic data associated with an approver that for approval of release of documents;
generating a first blockchain transaction that is based on: the document to be securely released, and the first cryptographic data that is associated with the submitter;
generating a second blockchain transaction that is cryptographically linked, directly or indirectly, to the first blockchain transaction, wherein the second blockchain transaction is to a blockchain identifier associated with the approver and the second blockchain transaction is based on the document;

submitting the first blockchain transaction and the second blockchain transaction to one or more computing nodes of a distributed blockchain computing system for incorporation into a blockchain; and generating, based on a received command, a third blockchain transaction based on content to be released, which is or is based on the document that has been approved, wherein the third blockchain transaction is cryptographically linked, directly or indirectly, to both the first transaction and the second blockchain transaction, wherein the third blockchain transaction includes programmatic locking code that includes a plurality of conditions that must be satisfied, wherein a plurality of intended recipients cannot access the content to be released on which the third blockchain transaction is based until each of the plurality of conditions that are part of the programmatic locking code have been satisfied.

20. The non-transitory computer readable storage medium of claim 19, wherein third cryptographic data is associated with at least one editor, the operations further comprising:

receiving, in connection with the editor, edits of the document;

generating a fourth blockchain transaction based on the edits of the document and/or an edited version of the document; and communicating the fourth blockchain transaction to at least one computing node of the blockchain computing system for incorporation into the blockchain, wherein the fourth blockchain transaction is linked to, directly or indirectly, the first and second blockchain transactions, wherein the third blockchain transaction is cryptographically linked to the fourth blockchain transaction.

* * * * *